United States Patent [19]

Pitts

[11] Patent Number: 5,160,774
[45] Date of Patent: Nov. 3, 1992

[54] SCORCH PREVENTION DEVICE

[76] Inventor: Robert L. Pitts, 1850 State Rte. 12, Fremont, Ohio 43420

[21] Appl. No.: 636,274

[22] Filed: Dec. 31, 1990

[51] Int. Cl.$^5$ ............................ B32B 3/06; B32B 1/04
[52] U.S. Cl. ........................................ 428/83; 428/99; 428/920; 169/48
[58] Field of Search .......................... 428/83, 99, 920; 126/544, 547; 169/48, 49, 50

[56] References Cited

U.S. PATENT DOCUMENTS

| | | | |
|---|---|---|---|
| 3,971,867 | 7/1976 | Randall | 428/83 |
| 3,980,272 | 9/1976 | Nakai et al. | 169/48 |
| 4,106,476 | 8/1978 | Harsha | 126/547 |

FOREIGN PATENT DOCUMENTS

| | | | |
|---|---|---|---|
| 312820 | 6/1929 | United Kingdom | 126/547 |
| 1500912 | 2/1978 | United Kingdom | 169/48 |

OTHER PUBLICATIONS

*Primary Examiner*—Alexander S. Thomas
*Attorney, Agent, or Firm*—Dickinson, Wright, Moon, Van Dusen & Freeman

[57] ABSTRACT

A device for protecting a structure from scorching during heat-producing operations such as welding includes a silicon bonded board about ½ inch thick, a metal channel frame surrounding the board and a hanger for hanging the device from the structure. The board is interposed between the heat-producing source and the structure to be protected, whereby the structure is protected from scorching or burning.

2 Claims, 1 Drawing Sheet

SCORCH PREVENTION DEVICE

FIELD OF THE INVENTION

The invention relates to portable devices for prevention of scorching or burning adjacent welding or soldering operations.

BACKGROUND OF THE INVENTION

Known devices are directed to containing heat generated by soldering or welding and not to protection of the underlying structures or fittings. Other devices are intended to smother burning beneath the device.

Miller, U.S. Pat. No. 1,805,181, describes a heat retaining hood for use during gas or electric fusion welding. The hood may be made of material which is a poor conductor of heat, such as firebrick, magnesia or asbestos. Due to the low heat conductivity of these materials, the heat is concentrated close to the weld and is not carried away. The hood is moved along the weld as the weld is formed. Chamberlain, U.S. Pat. No. 4,269,901, describes a portable shield of flexible, heat-insulating material, such as aluminized fiberglass. The shield has a top stiffener member and a handle and is used for firefighting.

Skinner et al., U.S. Pat. No. 4,849,273, describes a welding blanket used to protect surrounding structures from spatters of molten metal during welding. The blanket is a flexible three-layer device comprising outer layers of non-woven rayon fabric and an inner layer of vermiculite, fiberglass and other heat-resistant material. The patent to Doyle, U.S. Pat. No. 2,340,370, describes a fire-extinguishing blanket including connected cells containing fire-smothering material. A combustible layer covers one side of the blanket. The blanket is thrown onto the fire, the combustible covering is burned and the smothering material released to extinguish the fire.

The Shving patent, U.S. Pat. No. 1,238,583, describes a flail for beating out grass or brush fires. The device includes an asbestos panel which is stiffened by sheet metal panels on each side. Obert, U.S. Pat. No. 2,123,612, describes a heat economizer, made of any suitable refractory material, which controls and conserves heat during gas fusion welding or other heat producing operations. The heat produced is confined within an enclosure to maximize the benefit of the heat produced.

SUMMARY OF THE INVENTION

A device for protecting a structure from scorching during heat-producing operations such as welding includes a silicon bonded board about ½ inch thick, a metal channel frame surrounding the board and a hanger for hanging the device from the structure. The board is interposed between the heat-producing source and the structure to be protected, whereby the structure is protected from scorching or burning.

DETAILED DESCRIPTION OF THE INVENTION

The invention is a portable device used to protect structural members, such as studs, cabinets, etc., adjacent welding or soldering operations. Such a device is useful in partially completed structures or in occupied buildings in which soldering, welding or other heat and/or spatter producing operations may take place. Use of the device guards against scorching or burning of structural framing members such as studs, interior fittings such as cabinets, and/or door and window frames, etc. The device is strong, easily portable and inexpensive to manufacture.

In a typical use, a device of the invention is used by plumbers to prevent burning or scorching of studs or drywall while soldering copper water lines. Other uses will be apparent to those skilled in the art.

Figure 1:
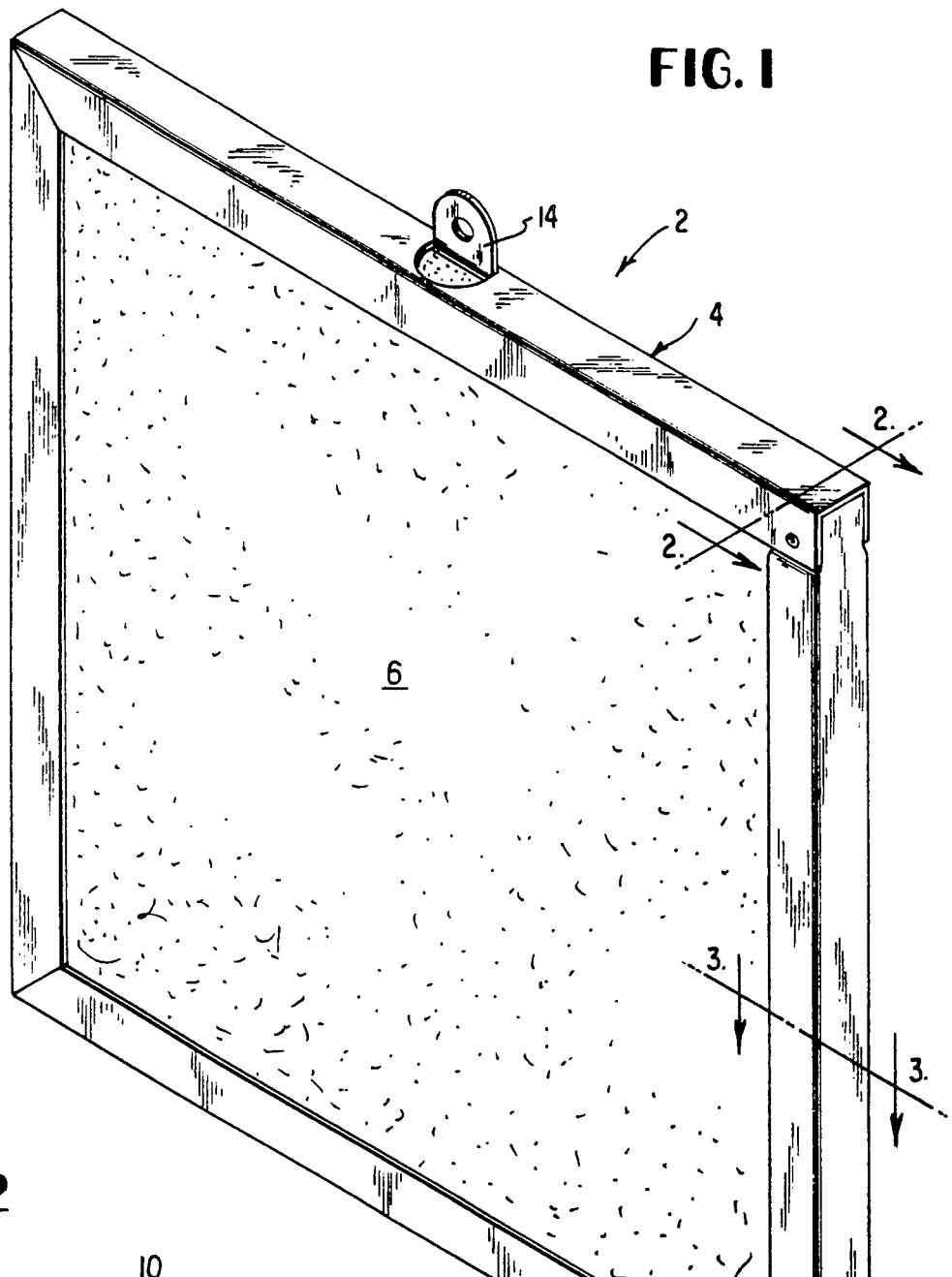
FIG. 1 is a perspective view of a scorch prevention device according to the invention.
Figure 2:
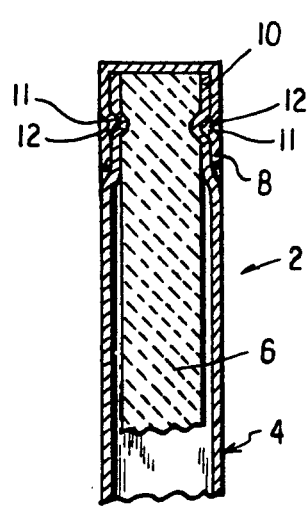
FIG. 2 is a cross-sectional view taken on line 2—2 of FIG. 1.
Figure 3:
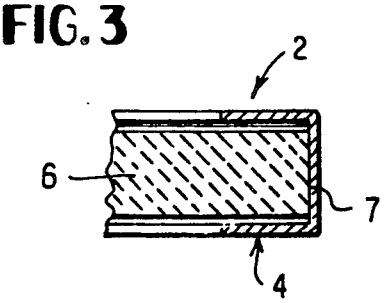
FIG. 3 is a cross-sectional view taken on line 3—3 of FIG. 1.

With reference to FIGS. 1 to 3, in which like numerals represent like parts, FIG. 1 illustrates scorch prevention device 2 which includes a metal channel frame 4 surrounding a fireproof panel 6. The panel is preferably a silica bonded board, such as that marketed by Rex Roto Corporation of Fowlerville, Mich., under the trademark "Pyroboard".

"Pyroboard" silica bonded board contains a combination of organic and inorganic binders. The board is chemically stable, has a uniform density and is a good insulator. "Pyroboard" silica bonded board provides excellent resistance to thermal shock and is stable at temperatures up to 2300 degrees F.

The board is produced by a vacuum forming process, and is machined so that both surfaces are smooth. The organic content is low to ensure no significant burn-off during start up and use. The organic binder provides extra strength initially and decomposes and is removed at about 350 to 1000 degrees F. The inorganic binders furnish high fired strength.

Channel frame 4 may be a welded metal channel frame or a stamped metal channel, as shown in the figures. Frame 4 typically has a U-shaped cross-section, shown in FIG. 3, covering edge 7 of panel 6. Other shapes may also be useful. Panel 6 is generally square or rectangular and may, in a non-limiting example, be about 12 inches square and ½ inch thick.

As shown in FIG. 1, panel 6 is surrounded by channel frame 4 which is made in a single piece having right-angled corners precut and mitred to fit together. Ends 8 and 10 of frame 4 are snapped together at cooperating protrusions 11 and valleys 12, to securely hold the panel. Ends 8 and 10 may be secured together in any other appropriate manner, such as by welding or riveting. Separate channel members for each side of the frame, snapped together at each corner, may also be used. Suitable materials for the metal frame include metals such as steel, aluminum and alloys thereof.

A hook 14, which may be of any suitable shape and size may be stamped out of frame 4, as shown in FIG. 1. Hook 14 allows the scorch preventing device to be hung on a nail driven into a stud adjacent the welding area. Alternatively, a hole for hanging the device may be driven through the board alone or through the channel and board combined. A device of the invention is readily moved from place to place on a building site.

The board is used as a protective device. It does not trap heat, but lets it dissipate in the atmosphere while structures and structural members adjacent the heat producing operation are protected. The device may readily be carried as part of welding or soldering equipment and is easy to use.

While the invention has been described with respect to certain embodiments thereof, it will be appreciated that variations and modifications may be made without departing from the spirit and scope of the invention.

What is claimed is:

1. A scorch protection device for protecting a structural member from scorching during a welding or soldering process taking place in proximity to said member, comprising:

a) a fireproof panel;

b) frame means comprising a substantially continuous metallic channel engaging said panel, said substantially continuous channel having end portions comprising mating protrusions and valleys for permitting said end portions to snap together and for securing said frame in holding relationship to said panel; and c) means structurally connected to said panel for hanging said panel adjacent said structural member.

2. A scorch protection device according to claim 1 wherein said fireproof panel comprises silica bonded board.

* * * * *